United States Patent [19]

Obara et al.

[11] Patent Number: 4,469,927
[45] Date of Patent: Sep. 4, 1984

[54] POWER SOURCE ARRANGEMENT FOR WIRE-CUT, ELECTRIC DISCHARGE MACHINING

[75] Inventors: Haruki Obara, Sagamihara; Shunzo Izumiya, Hachioji, both of Japan

[73] Assignee: Fanuc Ltd., Tokyo, Japan

[21] Appl. No.: 456,060

[22] PCT Filed: May 12, 1982

[86] PCT No.: PCT/JP82/00163
§ 371 Date: Jan. 5, 1983
§ 102(e) Date: Jan. 5, 1983

[87] PCT Pub. No.: WO82/04001
PCT Pub. Date: Nov. 25, 1982

[30] Foreign Application Priority Data

May 14, 1981 [JP] Japan .................................. 56-72579

[51] Int. Cl.³ .................................................. B23P 1/08
[52] U.S. Cl. ............................... 219/69 C; 219/69 G; 219/69 W
[58] Field of Search ................ 219/69 W, 69 P, 69 C, 219/69 S

[56] References Cited
U.S. PATENT DOCUMENTS 4,347,425  8/1982  Obara ............................. 219/69 P
4,387,285  6/1983  Obara ............................. 219/69 P

FOREIGN PATENT DOCUMENTS 0147594 11/1979 Japan ............................. 219/69 W

*Primary Examiner*—M. H. Paschall
*Attorney, Agent, or Firm*—Staas & Halsey

[57] ABSTRACT

The present invention is directed to an arrangement for wire-cut, electric discharge machining in which the charged voltage of a capacitor is applied across a wire electrode and a workpiece and the terminal voltage of the capacitor is controlled to perform electric discharge machining of the workpiece at an increased cutting speed.

A capacitor (15) for applying a voltage across a workpiece (16) and a wire electrode (17) for electric discharge machining is charged from a DC power source (11) via a transistor (13) serving as a switching element; a transistor (24) serving as an auxiliary switching element is connected in parallel to the transistor (13); and the terminal voltage of the capacitor (15) is detected to control the transistor (24), by which the terminal voltage of the capacitor (15) is maintained at an intermediate level (H1), lowering the mean working voltage.

6 Claims, 6 Drawing Figures 4,469,927

POWER SOURCE ARRANGEMENT FOR WIRE-CUT, ELECTRIC DISCHARGE MACHINING

BACKGROUND OF THE INVENTION

The present invention relates to a power source arrangement for wire-cut, electric discharge machining which provides for increased cutting speed during wire-cut, electric discharge machining.

In wire-cut, electric discharge machining, for example, as shown in FIG. 1, a transistor 3 is controlled to be turned ON and OFF by pulses from a pulse generator 4 and, when the transistor 3 is in the ON state, a capacitor 5 is charged via a resistor 2 from a DC power source 1 and then the charged voltage of the capacitor 5 is applied across a wire electrode 7 and a workpiece 6, thereby performing electric discharge machining. Reference numeral 8 indicates a contactor, and 9 and 10 designate guides.

The voltage across the wire electrode 7 and the workpiece 6, that is, the gap voltage undergoes such variations, for instance, as shown in FIG. 2. That is to say, discharge occurs after or during charging of the capacitor 5. Experimental results have revealed that the cutting speed increases with a decrease in the charging voltage of the capacitor. The reason for this has not been made sufficiently clear yet, but it is said that, for example, if the capacitor charging voltage is high, the gap between the wire electrode and the workpiece is enlarged by electric discharge machining, making it difficult for a discharge produced at a point to shift to another point.

One might consider lowering the voltage of the DC power source 1 so as to make the charging voltage of the capacitor 5 lower, but this would reduce the charging energy of the capacitor 5, making it impossible to enhance the cutting speed. Also it would be possible to increase the value of the resistor 2, but this would also have the defects of lowered charging speed and increased power loss.

SUMMARY OF THE INVENTION

The present invention overcomes such defects of the prior art as mentioned above and has for its object to improve the cutting speed by controlling the capacitor charging voltage.

According to the present invention, in a power source arrangement for wire-cut, electric discharge machining which applies the charged voltage of a capacitor across a wire electrode and a workpiece to perform electric discharge machining of the workpiece, an auxiliary switching element is connected in parallel to a switching element performing control of the charging of the capacitor and the auxiliary switching element is controlled in accordance with the terminal voltage of the capacitor, thereby making the terminal voltage of the capacitor optimum for the electric discharge machining.

DESCRIPTION OF THE PREFERRED EMBODIMENTS OF THE INVENTION

Figure 1:
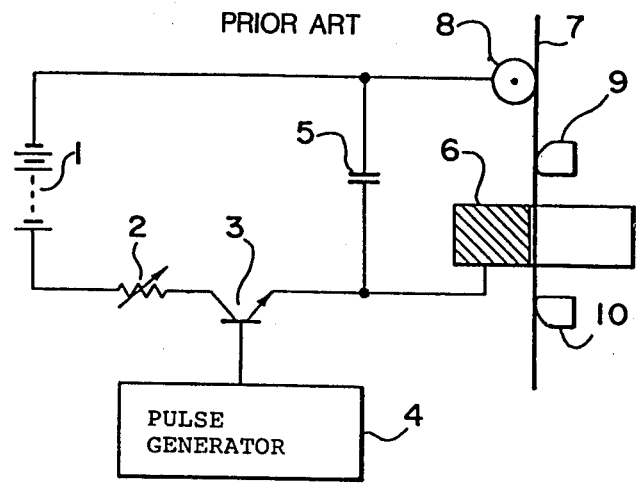
FIG. 1 is a circuit diagram showing the principal part of a conventional power source arrangement for wire-cut, electric discharge machining.
Figure 2:
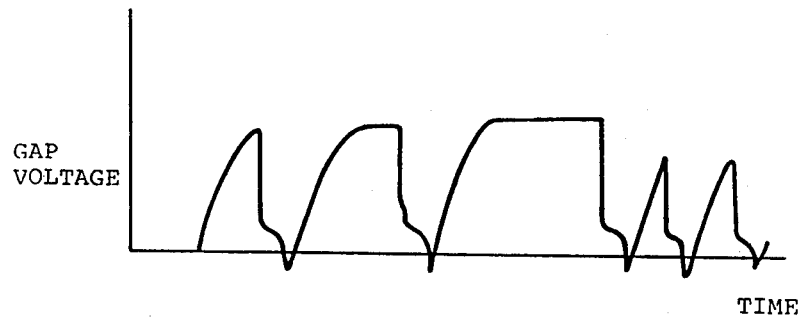
FIG. 2 is waveform diagram showing, by way of example, a gap voltage.
Figure 3:
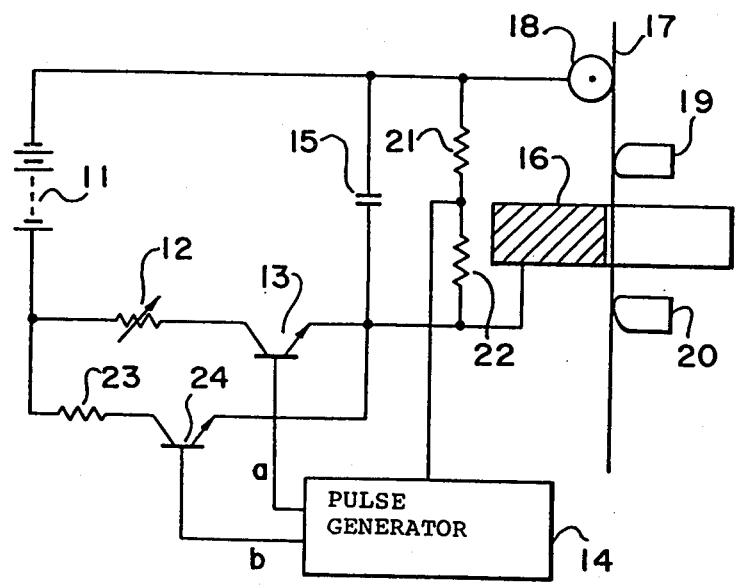
FIG. 3 is a circuit diagram illustrating the principal part of an embodiment of the present invention.

FIG. 3 illustrates a principal circuit of an embodiment of the present invention, which is identical with the prior art example of FIG. 1 with regard to a DC power source 11, a resistor 12, a transistor 13, a capacitor 15, a workpiece 16, a wire electrode 17, a contactor 18 and guides 19 and 20. However the arrangement is such that a gap voltage voltage-divided by resistors 21 and 22 is applied to a pulse generator 14, the transistor 13 is controlled by control pulses a from the pulse generator 14, the transistor 24 is controlled by pulses b and the charging of the capacitor 15 is controlled via a resistor 23.

Supplied with a voltage proportional to the gap voltage from the resistors 21 and 22, the pulse generator 14 detects that the charging voltage of the capacitor 15 has reached a predetermined value, and turns OFF the transistor 13, and when no discharge is produced between the wire electrodes 17 and workpiece 16, the terminal voltage of the capacitor 15 drops owing to leakage current across the gap. When this terminal voltage has dropped to a certain value, the transistor 24 is turned ON, and a current corresponding to the leakage current is supplied via the resistor 23 from the DC power source 11, maintaining the terminal voltage of the capacitor 15 at a certain value. And when the terminal voltage of the capacitor 15 has further dropped due to discharge, the transistor 24 is turned OFF.

Figure 4:
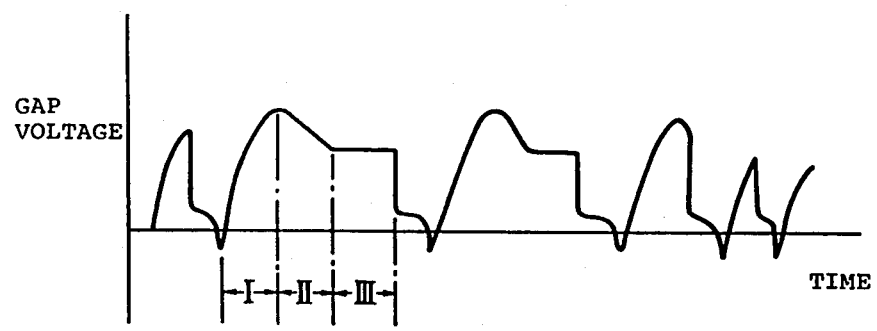
FIG. 4 is a waveform diagram showing an example of a gap voltage as in FIG. 3.

FIG. 4 is explanatory of the gap voltage. In a region I, the transistor 13 is turned ON to charge the capacitor 15; in a region II, the transistor 13 is in the OFF state and the gap voltage drops owing to the leakage current across the gap; and in a region III, the transistor 24 is turned ON to supply the current corresponding to the leakage current, thereby retaining the gap voltage at a certain value. There are cases where the discharge is produced during the charging in the region I, after the charging in the region II and while retaining the low voltage in the region III. Since the case of producing the discharge while maintaining the low voltage as in the region III is included, the mean working voltage can be lowered and the cutting speed can improved. This has been ascertained by experiments, too.

Figure 6:
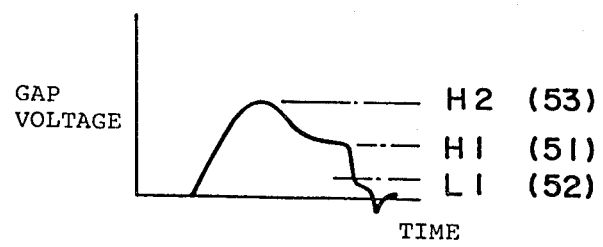
FIG. 6 is a diagram explanatory of setting levels.
Figure 5:
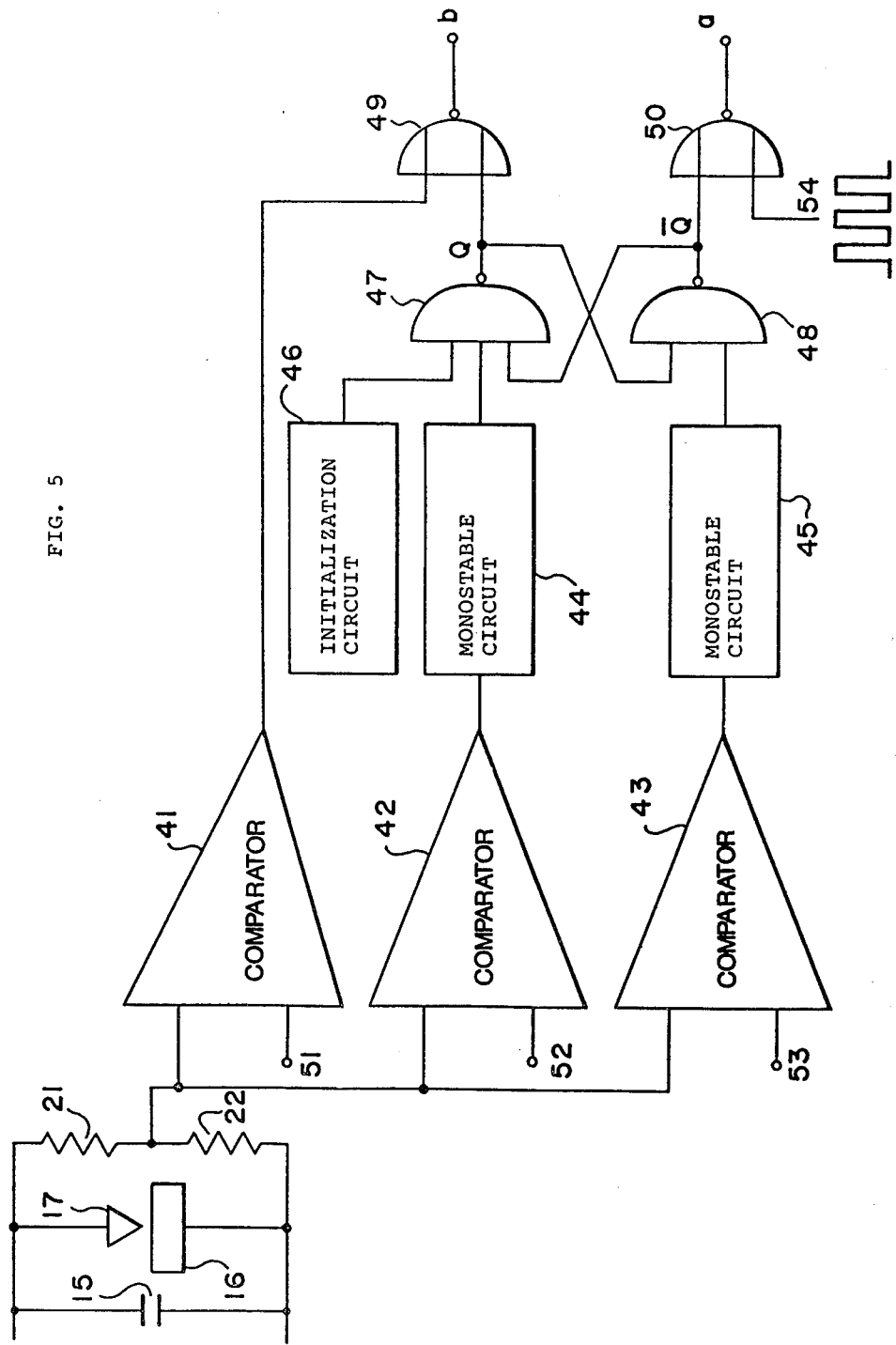
FIG. 5 is a block diagram showing a pulse generator for use in the present invention.

FIG. 5 is a block diagram showing the principal part of the pulse generator 14. Reference numerals 41 to 43 indicate comparators; 44 designates a monostable circuit which is triggered with the fall; 45 identifies a monostable circuit which is triggered with the rise; 46 denotes an initialization circuit; 47 and 48 represent NAND circuits constituting a flip-flop; 49 and 50 show NOR circuit; 51 and 53 refer to reference voltages; and 54 signifies charging pulses of a predetermined period. And 15, 16, 17, 21 and 22 indicate the capacitor, the workpiece, and the wire electrode shown in FIG. 1. The reference voltages 51 to 53 for the comparators 41 to 43 are selected so that an intermediate level H1, a low level L1 and a high level H2 of the terminal voltage of the capacitor 15 may be detected as shown in FIG. 6.

In the case where the terminal voltage of the capacitor 15 is zero, the voltage divided by the resistors 21 and 22 also becomes zero, resulting in the outputs of the comparators 41 to 43 going to "0"s. In this state the flip-flop is set by the initialization circuit 46 to provide a "1" and a "0" from its Q and Q̄ outputs, respectively. In consequence, a control pulse b derived from the NOR circuit 49 goes to a "0" and a control pluse a from the NOR circuit 50 goes to a "1" and a "0" following the pulses 54. The transistor 24 (see FIG. 3) is turned OFF since the control pulse b is at the "0" state, and the transistor 13 is repeatedly turned ON and OFF following the control pulse a. Accordingly, while the transistor 13 is in the ON state, the capacitor 15 is charged, raising its terminal voltage.

When the terminal voltage of the capacitor 15 exceeds the low level L1, the output from the comparator 42 goes to a "1" but the monostable circuit 44 is not triggered. When the terminal voltage of the capacitor 15 rises up to the intermediate level H1, the output from the comparator 41 goes to a "1" and the control pulse b remains at the "0" level.

When the terminal voltage of the capacitor 15 further rises up to the high level H2, the output from the comparator 43 goes to a "1" and, by the rise of the output from the "0" level to the "1" level, the monostable circuit 45 is triggered, by the output of which the flip-flop is reset in the state of Q="0" and e,ovs/Q/ ="1". Consequently, the control pulse a from the NOR circuit 50 goes to a "0", turning OFF the transistor 13. Thus the charging of the capacitor 15 is stopped and a leakage current flows across the wire electrode 17 and the workpiece 16, resulting in the terminal voltage of the capacitor 15 gradually falling.

When the terminal voltage of the capacitor 15 becomes lower than the intermediate level H1, the output from the comparator 41 goes to a "0". Accordingly, the control pulse b from the NOR circuit 49 goes to a "1" and the transistor 24 is turned ON to supply from the DC power source 11 a current corresponding to the leakage current, maintaining the terminal voltage of the capacitor 15 in the vicinity of the intermediate level H1. When the terminal voltage of the capacitor 15 is raised by the current supplied via the transistor 24 to exceed the intermediate level H1, the output from the comparator 41 goes to "1" to make the control pulse b a "0", turning OFF the transistor 24. The comparators 41 and 43 have a construction which possesses known hysteresis characteristics, and the terminal voltage of the capacitor 15 is held substantially constant centering about the intermediate level H1 as indicated by the region III in FIG. 4.

When a discharge is produced between the wire electrode 17 and the workpiece 16, the terminal voltage of the capacitor 15 rapidly drops and when it becomes lower than the level L1, the outputs from the comparators 41 to 43 each go to a "0" and the monostable circuit 44 is triggered by the fall of the output from the "1" level to the "0" level and its output is applied as a set pulse to the flip-flop to set it, returning to its initial state.

The above-described operation is performed in the case where a discharge is produced at the intermediate level H1. In the case of a discharge being produced in the region I, in which the terminal vlotage is rising up to the high level H2, the flip-flop remains in its set state and the terminal voltage of the capacitor 15 drops lower than the low level L1 and the monostable circuit 44 is triggered to output a set pulse. In this case, since the output state of the flip-flop remains unchanged, the control pulse a is applied to the transistor 13, starting charging of the capacitor 15.

In the case of a discharge being produced in the region II in which the terminal voltage is dropping from the high level H2 to the intermediate level H1, the flip-flop is in its reset state and the control pulses a and b are at the "0" level, holding the transistors 13 and 24 in the OFF state. When the terminal voltage becomes lower than the low level L1 owing to a discharge, the flip-flop is set to its initial state.

As will be appreciated from the description given above in respect of the operation, the comparator 43 and the monostable circuit 45 detect that a discharge has been produced, the comparator 42 and the monostable circuit 44 detect that the capacitor 15 has been charged up to a predetermined value, and the comparator 41 detects that the terminal voltage of the capacitor 15 is at the intermediate level H1. By this, the transistors 13 and 24 are controlled to reduce the mean working voltage and increase the cutting speed. Also it is possible to substitute the transistors 13 and 24 with switching elements, such as FETs, thyristors or the like, and the NAND circuits and the NOR circuits can be formed by other logic circuits.

As has been described in the foregoing, according to the present invention, a switching element, such as the transistor 13, is controlled to be turned ON and OFF; when it is in the ON state, the capacitor 15 is charged; the terminal voltage of the capacitor 15 is applied across the wire electrode 17 and the workpiece 16 to perform electric discharge machining; an auxiliary switching element, such as the transistor 24, is connected in parallel to the switching element; when it is detected by means composed of the comparator 43 and the monostable circuit 45 that the terminal voltage of the capacitor 15 has reached the high level H2, the switching element is turned OFF; when it is detected by means composed of the comparator 41 that the terminal voltage of the capacitor 15 has been reduced down to the intermediate level H1 due to a leakage current across the wire electrode 17 and the workpiece 16 thereafter, the auxiliary switching element is turned ON to supply a current corresponding to the leakage current; and when it is detected by means composed of the comparator 42 and the monostable circuit 44 that the terminal voltage of the capacitor 15 has been reduced down to the low level L1 owing to a discharge, the auxiliary switching element is turned OFF and the ON-OFF control of the switching element is started. Even if the voltage of the DC power source 11 is raised to permit high-speed charging of the capacitor 15, the mean working voltage can be lowered because the terminal voltage of the capacitor 15 can be held at the intermediate level H1. Accordingly, the cutting speed can be raised.

What we claim is:

1. An improved power source arrangement for wire-cut, electric discharge machining of the type which performs ON-OFF control of a first switching element, such as a transistor or the like, charges a capacitor when the first switching element is in the ON state, and applies a terminal voltage of the capacitor across a wire electrode and a workpiece, thereby to perform electric discharge machining of the workpiece, wherein the improvement comprises: a second switching element connected in parallel to the first switching element, for supplying current to said capacitor, said current corresponding to a leakage current across the wire electrode and the workpiece; means for detecting high, intermediate and low levels of the terminal voltage of the capacitor; and control means for turning OFF the first switching element when it is detected by the detecting means that the terminal voltage of the capacitor has reached the high level, said control means additionally including means for turning ON the second switching element when it is detected that the terminal voltage of the capacitor has dropped from the high level to the intermediate level, and means for turning OFF the second switching element and causing the ON-OFF control of the first switching element to start when it is detected that the terminal voltage of the capacitor has dropped to the low level.

2. The improvement of claim 1, wherein the means for detecting high, intermediate, and low levels comprises a voltage divider connected across the capacitor, and first, second, and third comparators each having a first terminal connected to the voltage divider and a second terminal, the second terminal of the first comparator receiving an intermediate reference voltage, the second terminal of the second comparator receiving a low reference voltage, and the second terminal of the third comparator receiving a high reference voltage.

3. The improvement of claim 2, wherein said control means includes a flip-flop having first and second inputs and Q and $\overline{Q}$ outputs, means for communicating the output of the second comparator to the first input of the flip-flop, means for communicating the output of the third comparator to the second input of the flip-flop, and means for initializing the Q and $\overline{Q}$ outputs when the output of all comparators is "0."

4. The improvement of claim 3, wherein the means for communicating the output of the second comparator comprises a monostable circuit triggered by a falling voltage and wherein the means for communicating the output of the third comparator comprises a monostable circuit triggered by a rising voltage.

5. The improvement of claim 4, wherein said control means additionally comprises a first gate having a first input connected to the output of the first comparator and a second input connected to the Q output of the flip-flop, the output of the first gate controlling said second switching element, and a second gate having a first input connected to the $\overline{Q}$ output of said flip-flop and a second input connected to means for generating pulses of predetermined period, the output of the second gate controlling said first switching element.

6. The improvement of claim 4, wherein said first and second switching elements are transistors, said flip-flop is formed by cross-connected NAND gates, and said first and second gates are NOR gates.

* * * * *

UNITED STATES PATENT AND TRADEMARK OFFICE
CERTIFICATE OF CORRECTION

PATENT NO. :     4,469,927
DATED     :      September 4, 1984
INVENTOR(S) :    HARUKI OBARA ET AL It is certified that error appears in the above-identified patent and that said Letters Patent is hereby corrected as shown below:

Column 1, line 22, after "voltage", insert --,--.

Column 2, line 14, after "However", insert --,--.

Column 3, line 24, "e,ovs/Q1" should be --$\bar{Q}$--;
         line 61, "vlotage" should be --voltage--.

Signed and Sealed this

Sixteenth Day of July 1985

[SEAL]

*Attest:*

DONALD J. QUIGG

*Attesting Officer*       *Acting Commissioner of Patents and Trademarks*